(12) United States Patent
Jeon et al.

(10) Patent No.: US 10,777,862 B2
(45) Date of Patent: Sep. 15, 2020

(54) BATTERY COOLING DEVICE FOR VEHICLE

(71) Applicants: Hyundai Motor Company, Seoul (KR); Kia Motors Corporation, Seoul (KR)

(72) Inventors: Yoon Cheol Jeon, Gyeonggi-do (KR); Min Wook Kim, Gyeonggi-do (KR); Dal Kim, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 358 days.

(21) Appl. No.: 15/829,950

(22) Filed: Dec. 3, 2017

(65) Prior Publication Data

US 2019/0123405 A1 Apr. 25, 2019

(30) Foreign Application Priority Data

Oct. 20, 2017 (KR) .......................... 10-2017-0136250

(51) Int. Cl.
| | |
|---|---|
| *H01M 10/6569* | (2014.01) |
| *H01M 10/613* | (2014.01) |
| *H01M 10/625* | (2014.01) |
| *H01M 10/647* | (2014.01) |
| *H01M 10/6554* | (2014.01) |
| *H01M 10/6556* | (2014.01) |
| *H01M 10/6552* | (2014.01) |
| *H01M 10/6568* | (2014.01) |
| *H01M 10/6551* | (2014.01) |
| *H01M 6/50* | (2006.01) |

(52) U.S. Cl.
CPC ..... *H01M 10/6569* (2015.04); *H01M 10/613* (2015.04); *H01M 10/625* (2015.04); *H01M 10/647* (2015.04); *H01M 10/6551* (2015.04); *H01M 10/6552* (2015.04); *H01M 10/6554* (2015.04); *H01M 10/6556* (2015.04); *H01M 10/6568* (2015.04); *H01M 6/5038* (2013.01); *H01M 2220/20* (2013.01)

(58) Field of Classification Search
CPC combination set(s) only.
See application file for complete search history.

(56) References Cited

U.S. PATENT DOCUMENTS

2005/0167169 A1 8/2005 Gering et al.
2010/0307723 A1* 12/2010 Thomas ............. B60H 1/00278
165/104.33

(Continued)

FOREIGN PATENT DOCUMENTS

KR 2010-0054684 A 3/2011

*Primary Examiner* — Christopher P Domone
(74) *Attorney, Agent, or Firm* — Mintz Levin Cohn Ferris Glovsky and Popeo, P.C.; Peter F. Corless

(57) ABSTRACT

A battery cooling device for a vehicle is provided. The device repeats phase changes of a refrigerant to cool a battery due to heat of vaporization when a liquid-state refrigerant is vaporized by thermally coming in contact with a battery heat source. The vaporized refrigerant is changed back into a liquid state by thermally coming in contact with a separate coolant. The effect of cooling all battery cells is maximized throughout the entire refrigerant channel for cooling a battery and the battery cells are cooled uniformly.

10 Claims, 3 Drawing Sheets

(56) References Cited

U.S. PATENT DOCUMENTS

2011/0262794 A1* 10/2011 Yoon ................ H01M 10/6554
429/120
2012/0196157 A1    8/2012 Krestel et al.
2016/0344071 A1   11/2016 Zheng et al.

* cited by examiner

BATTERY COOLING DEVICE FOR VEHICLE

CROSS-REFERENCE TO RELATED APPLICATION

This application claims under 35 U.S.C. § 119(a) the benefit of priority to Korean Patent Application No. 10-2017-0136250 filed on Oct. 20, 2017, the entire contents of which are incorporated herein by reference.

BACKGROUND

Technical Field

The present disclosure relates to a battery cooling device for a vehicle, and more particularly, to a battery cooling device for a vehicle that maintains the temperature of a battery cell within a predetermined range using a phase change of a refrigerant.

Background Art

Recently, long-distance and high-power/high-performance driving and rapid charging are required for electric vehicles, and thus, a high current flows to the battery cells of a battery system that is an energy supply source, thereby generating heat at a greater temperature than the battery cells that have been applied to existing electric vehicle. The heat generated by battery cells critically influences the lifespan of a battery, and thus, the heat should be controlled within a predetermined temperature range.

An air-cooling system that uses the air within a vehicle cabin to cool battery cells by supplying the air to a battery system using a cooling fan and a water-cooling system that cools battery cells by supplying to the battery system a coolant cooled by a specific chiller operated with a radiator or an air conditioner compressor at the front of a vehicle, using a pump have been applied to existing an electric vehicle to adjust the temperature of the battery cells. However, since a high current is used to drive an electric vehicle to a long distance with high power and high performance, the capacities of the air conditioner compressor (or the radiator) and the chiller are required to increase to remove the heat generated from battery cells even when applying the existing water-cooling systems.

The above information disclosed in this section is merely for enhancement of understanding of the background of the invention and therefore it may contain information that does not form the prior art that is already known in this country to a person of ordinary skill in the art.

SUMMARY

The present invention provides a battery cooling device, the device repeating phase changes of a refrigerant in a way that a battery is cooled due to heat of vaporization when a liquid-state refrigerant is vaporized by thermally coming in contact with a battery heat source and the vaporized refrigerant is changed back into liquid state by thermally coming in contact with a separate coolant, whereby it may be possible to maximize the effect of cooling all battery cells throughout the entire refrigerant channel for cooling a battery and uniformly cool the battery cells.

In other words, the present invention employs a battery cooling structure that repeats continuous phase changes of a refrigerant in a refrigerant channel through which the refrigerant for cooling a battery module flows such that the cooling performance of the refrigerant on the battery cell (first cell) at the end of the upstream side of the refrigerant channel is maintained to the battery cell (last cell) at the end of the downstream side, thereby maximizing the effect of cooling all battery cells and uniformly cooling all battery cells.

In one aspect, the present invention provides a battery cooling device for cooling a battery module having a plurality of battery cells for a vehicle, the device may include: a refrigerant channel disposed in an arrangement direction of the battery cells to be able to exchange heat with the battery cells; and a coolant channel plate disposed to be able to exchange heat with the refrigerant channel and allow a coolant for cooling a refrigerant heated by heat from the battery cells in the refrigerant channel into a liquid state to flow therethrough. In an exemplary embodiment, the refrigerant channel may be disposed to be able to exchange heat with the battery cells through contact and the coolant channel plate may be disposed to be able to exchange heat with the refrigerant channel through contact.

In another exemplary embodiment, the refrigerant channel may have a plurality of refrigerant-heating channels through which the refrigerant may be heated by exchanging heat with the battery module and a plurality of refrigerant-cooling channels through which the refrigerant may be cooled by exchanging heat with the coolant channel plate, and the refrigerant-heating channels and the refrigerant-cooling channels may be disposed alternately in the arrangement direction of the battery cells. Accordingly, the refrigerant flowing through the refrigerant channel may be heated into gas state in the refrigerant-heating channels by heat from the battery cells and may be cooled into a liquid state in the refrigerant-cooling channels by a coolant in the coolant channel plate, and these phase changes of the refrigerant may be continued while the refrigerant flows through the refrigerant channel.

In addition, the coolant channel plate may have a coolant channel through which a coolant flows and the flow direction of the coolant may be perpendicular to the flow direction of the refrigerant flowing through the refrigerant channel. In another exemplary embodiment, the battery cells and the refrigerant-heating channels may be in contact with each other to be able to exchange heat through an intermediate having high heat transfer performance, and the coolant channel plate and the refrigerant-cooling channels may be in contact with each other to be able to exchange heat through another intermediate. Further, the coolant channel plate may have a plurality of coolant channels and the coolant channels may be arranged to face the refrigerant-cooling channels, respectively.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
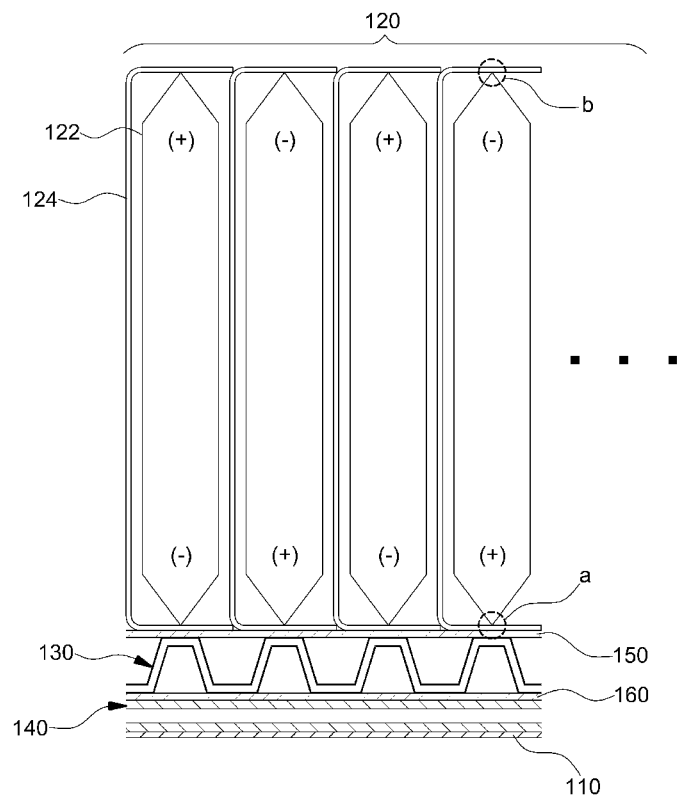
FIG. 1 is a view showing a battery cooling device for a vehicle according to an exemplary embodiment of the present invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present invention will be described for those skilled in the art to easily achieve it. When a liquid refrigerant is used cool a battery module that is a power source of an electric vehicle, battery cells may be cooled by the refrigerant absorbing heat generated by the battery cells until it is vaporized by the heat from the battery cells while passing through a refrigerant channel, but the battery cells may be minimally cooled by the refrigerant after the refrigerant is vaporized.

Further, the refrigerant heated in the refrigerant channel by the heat from the battery cells may be difficult to return to the initial phase after changed in a gas state, and the cooling performance thereof may be reduced in the gas state in comparison to the liquid state. Accordingly, there is a substantial difference in cooled degree between the battery cells that are cooled before the refrigerant flowing through the cooling channel is vaporized and the battery cells that are cooled after the refrigerant is vaporized. Therefore, the battery cells that are cooled after the refrigerant is vaporized are insufficiently cooled to the necessary level, and thus, it may be difficult to uniformly cool the battery cells of the battery module.

Accordingly, to maximize the effect of cooling the cells of the battery module and to uniformly cool the cells, the present invention employs a battery cooling structure that allows continuous phase change of a refrigerant for cooling the battery module in a refrigerant channel through which the refrigerant flows to maintain the cooling ability of the refrigerant for the battery cells at the same level throughout the entire battery module in which the refrigerant channel is disposed. A battery cooling device of the present invention may include: a refrigerant channel 130 disposed to be able to transfer heat to a plurality of battery cells 122 of a battery module 120; and a coolant channel plate 140 disposed to be able to transfer heat to the refrigerant channel 130 and through which a coolant flows for cooling the refrigerant heated through the refrigerant channel 130 by heat from the battery cells 122 into liquid (see FIG. 1).

Figure 2:
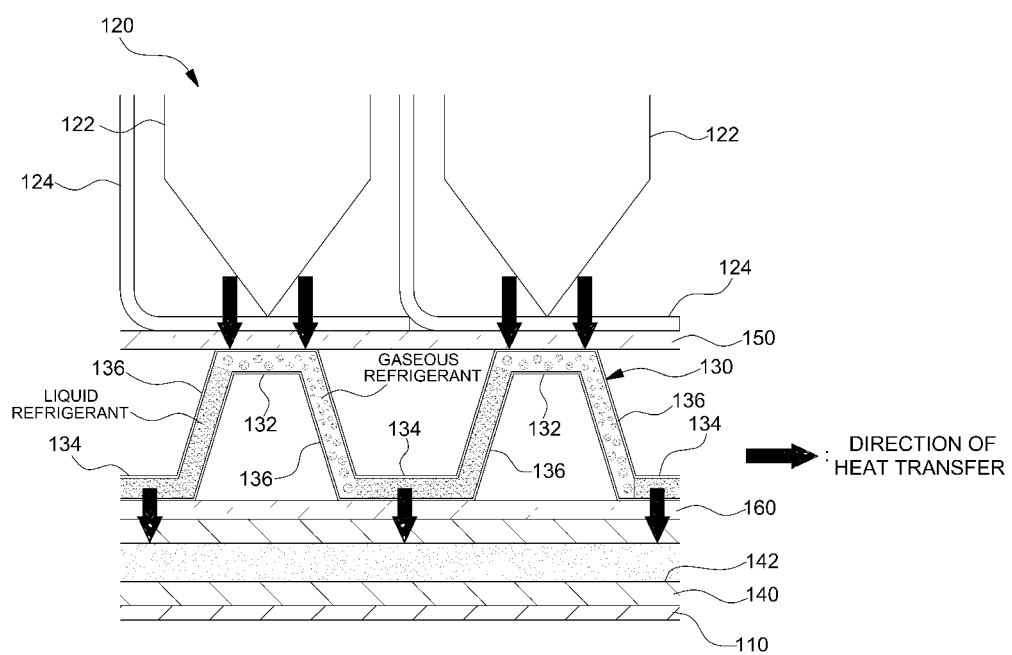
FIG. 2 is a partial enlarged view of FIG. 1 according to an exemplary embodiment of the present invention.

An exemplary embodiment of the battery cell cooling device is described with reference to FIGS. 1 and 2. Referring to FIGS. 1 and 2, the battery module 120, which is formed by combining a plurality of battery cells 122 electrically connected in series to each other, may be embedded in an electrolyte in a chamber surrounded by a battery case 110 and the battery cells 122, which are each minimum units for generating electricity, may be structurally separated from other battery cells by cell covers 124. The refrigerant channel 130 through which a refrigerant for cooling the cells of the battery module 120 is disposed to be able to exchange heat with the battery module 120 and, for example, the refrigerant channel 130 may be disposed between the battery module 120 and the battery case 110.

Referring to FIGS. 1 and 2, when the battery module 120 is mounted on a vehicle, the refrigerant channel 130 may be disposed under the battery module 120 and the battery cells 122 may be arranged in a line perpendicular to the vertical direction of the vehicle. The refrigerant channel 130 may be disposed in contact with the battery cells 122 to transfer heat, and in particular, the channel may extend in the arrangement direction of the battery cells 122. Further, the refrigerant channel 130 may be disposed to be able to transfer heat to the coolant channel plate 140 through which a coolant for cooling the refrigerant flowing through the refrigerant channel 130, and channel may be in contact with the coolant channel plate 140 to be able the exchange heat in an exemplary embodiment shown in FIG. 2. The coolant channel plate 140 may include a coolant channel 140 through which the coolant flows.

The refrigerant channel 130 may be disposed between the battery module 120 composed of the battery cells 122 and the coolant channel plate 140 through which the coolant flows, to heat the refrigerant flowing through the refrigerant channel 130 by heat discharged from the battery cells 122 and to cool the refrigerant by the coolant receiving heat from the refrigerant. In particular, the refrigerant may be heated into a gas state from a liquid state by heat from the battery cells 122 when flowing in the arrangement direction of the battery cells 122 through the refrigerant channel 130, and then may be cooled back into a liquid state by the coolant that receives heat from the refrigerant while flowing through the coolant channel plate 140. A high cooling effect for the cells 122 of the battery module 120 may be obtained through the repeated phase changes of the refrigerant and all of the cells 122 of the battery cell 120 may be cooled uniformly.

Accordingly, the refrigerant channel 130 may be formed in a plate-shaped tube type having a serpentine structure repeatedly curved up and down to be in contact with both of the battery cells 122 disposed over the channel and the coolant channel plate 140 disposed under the channel. In particular, the refrigerant channel 130 may be divided into a plurality of refrigerant-heating channels 132 being in contact with only the bottoms of the battery cells 122 of the battery cells 122 and the coolant channel plate 140, a plurality of refrigerant-cooling channels 134 being in contact with only the coolant channel plate 140, and refrigerant-passing channels 136 integrally connected between the refrigerant-heating channels 132 and the refrigerant-cooling channels 134 without being in contact with any one of the battery cells 122 and the coolant channel plate 140.

The refrigerant-heating channels 132 and the refrigerant-cooling channels 134 may be disposed alternately in the arrangement direction of the battery cells 122. The refrigerant-heating channels 132 may be arranged to be able to exchange heat with the battery cells 122 and the refrigerant-cooling channels 134 may be arranged to be able to exchange heat with the coolant channel plate 140 between refrigerant-heating channels 132 at both sides. For the heat exchange, the refrigerant-heating channels 132 may be disposed under the battery cells 122 to face the battery cells 122 and the refrigerant-cooling channels 134 may be disposed in contact with the coolant channel plate 140 between refrigerant-heating channels 132 at both sides.

The refrigerant channel 130 may be curved to cause the refrigerant-heating channels 132 and the refrigerant-cooling channels 134 to be in surface contact with the battery cells 122 and the coolant channel plate 140, respectively. The refrigerant-heating channels 132 being in contact with the battery module 120 and the refrigerant-cooling channel 134 being in contact with the coolant channel plate 140 may be connected to each other through the refrigerant-passing channels 136 and the refrigerant-passing channels 136 may be plate channels inclined at a predetermined angle to secure fluidity of the refrigerant.

Referring to FIG. 2, the refrigerant flowing through the refrigerant channel 130 may enter the refrigerant-heating channel 132 and may be heated by heat from the battery cell 122, in which the battery cell 122 may be cooled due to vaporization heat for vaporization of the refrigerant. The refrigerant vaporized through the refrigerant-heating channel 132 may be maintained in the gas state in the refrigerant-passing channel 136 and then may be cooled into a liquid state by heat from the coolant flowing through the coolant channel plate 140 when entering the refrigerant-cooling channel 134.

In other words, the refrigerant flowing through the refrigerant channel 130 may cool the battery cell 122 by vaporizing when coming in contact with the battery module 120 in a liquid state and may be changed back into a liquid state by coming in contact with the coolant channel plate 140 in a gas state, and the phase changes of the refrigerant may be continuously repeated while the refrigerant flows through the refrigerant channel 130. Accordingly, it may be possible to continuously cool the battery cells 122 at the same level throughout the entire battery module 120 throughout which refrigerant channel 130 is disposed. When the battery module is cooled only by the refrigerant channel 130 through which a refrigerant flows without the coolant channel plate 140 through which a coolant flows, the refrigerant may be unable to return to the liquid state after vaporizing, and thus, it may be difficult to cool all the battery cells being in contact with the refrigerant channel 130. Further, the phase changes of the refrigerant shown in FIG. 2 are merely an example and the areas where the refrigerant changes the phase in the refrigerant channel 130 are not limited thereto.

The refrigerant flowing through the refrigerant-passing channel 136 may maintain the phase that has been changed through the refrigerant-heating channel 132 or the refrigerant-cooling channel 134 and then may change in phase into a liquid state or a gas state as the refrigerant approaches and enters another refrigerant-cooling channel 134 or refrigerant-heating channel 132 at the downstream side (in the flow direction of the refrigerant). Further, the coolant flowing through the coolant channel plate 140 may be able to change a gaseous refrigerant into a liquid refrigerant so that a continuous phase change of the refrigerant is possible through the refrigerant channel 130, and the refrigerant may be selected in consideration of the operational temperature range of the battery cells 122.

Meanwhile, an intermediate 150 may be inserted between the battery module 120 and the refrigerant channel 130 to protect the battery module 120 from a refrigerant and a coolant when the refrigerant and coolant leak. The intermediate 150 may be disposed to allow heat to transfer between the battery module 120 and the refrigerant in the refrigerant channel 130 through the intermediate 150. According to the exemplary embodiment of FIG. 2, the intermediate 150, which is a plate-shaped member disposed at the interface between the battery module 120 and the refrigerant channel 130 to be able to transfer heat, may be in contact with both of the battery cells 122 and the refrigerant-heating channels 132 at the interface between the battery module 120 and the refrigerant channel 130.

The intermediate 150 may be made of a material having high heat transfer efficiency through surface contact to minimize reduction of heat transfer efficiency between the battery cells 122 and the refrigerant-heating channels 132. An intermediate 160 may be disposed also between the refrigerant-cooling channels 132 of the refrigerant channel 30 and the coolant channel plate 140. The intermediate 160 may prevent a coolant from flowing into the battery module 120 when the coolant leaks, may be made of a material having high heat transfer efficiency through surface contact to minimize reduction of heat transfer efficiency between the refrigerant in the refrigerant-cooling channel 134 and the coolant in the coolant channel plate 140, and may be a plate-shaped member, as shown in FIG. 2.

The intermediate 160 may be disposed to be able to transfer heat between the refrigerant-cooling channels 134 and the coolant channel plate 140, and according to the exemplary embodiment of FIG. 2, may be in contact with both of the refrigerant-cooling channel 134 and the coolant channel plate 140. For reference, referring to FIGS. 1 and 2, the battery cells 122 may be covered with cell covers 124 at least partially covering the battery cells 122, respectively and may be in contact with the refrigerant-heating channel 132 of the refrigerant channel 130 through the cell covers 124, and thus, the battery cells 122 and the refrigerant-heating channels 132 may be in contact with each other to allow heat to transfer therebetween. The cell covers 124 may be made of a material that allows the heat from the battery cells 122 to smoothly transfer to the refrigerant-heating channels 132.

Figure 3:
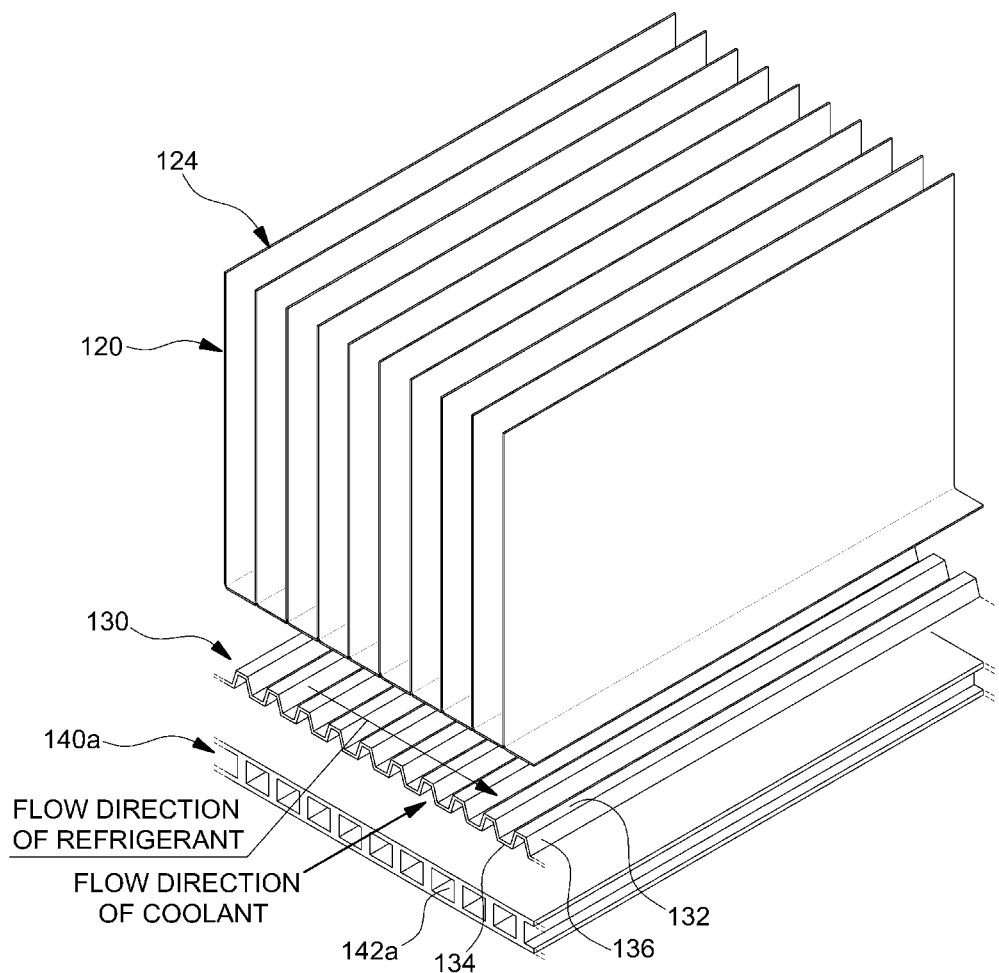
FIGS. 3 and 4 are views showing a battery cooling device according to another exemplary embodiment of the present invention.
Figure 4:
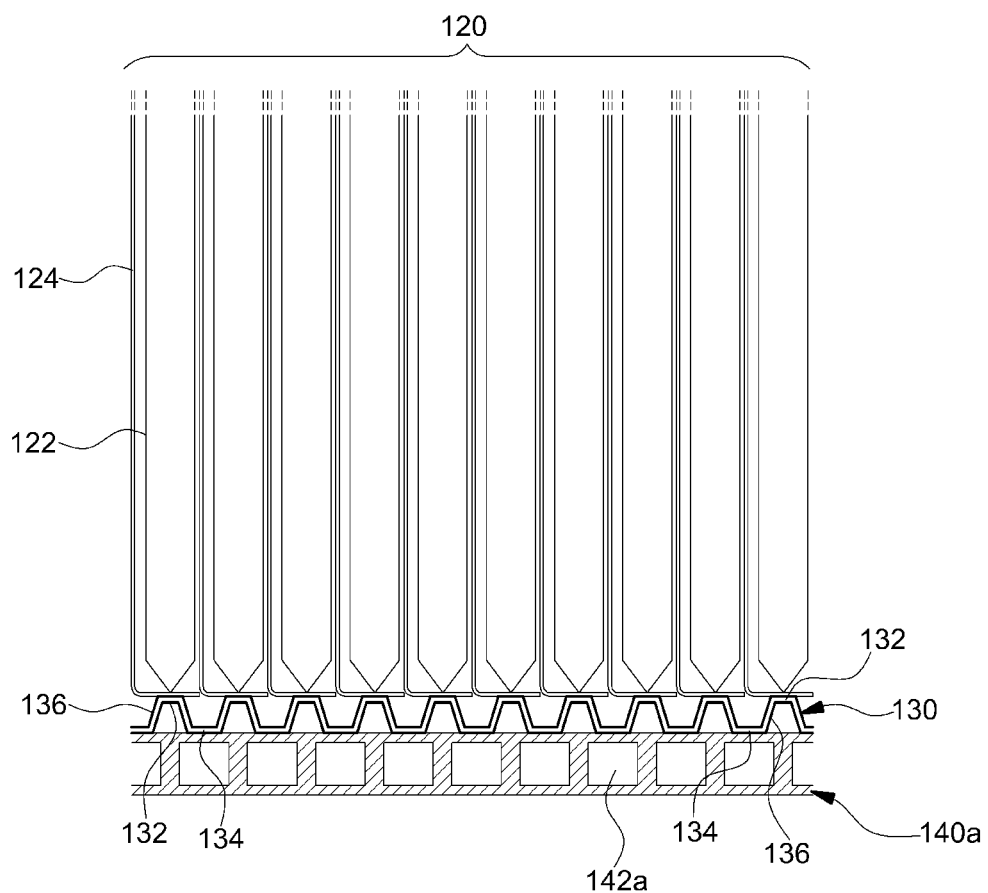

FIGS. 3 and 4 shows a battery cooling device for a vehicle having a coolant channel plate 140a according to another exemplary embodiment of the present invention and it should be noted that battery cells disposed in the cell covers 124 are not shown in FIG. 3. The coolant channel plate 140a may include coolant channels 142a through which a coolant may flow for cooling a refrigerant heated by heat from the battery cells 122 through the refrigerant channel 130.

The refrigerant flowing through the refrigerant-cooling channels 134 of the refrigerant channel 130 may be cooled while transferring heat to the coolant flowing through the coolant channels 142a. Accordingly, when a single coolant channel is provided regardless of the number of the refrigerant-cooling channels 134, the coolant may be heated by heat transmitted from the refrigerant at the upstream side of the refrigerant channel 130 in the flow direction of the refrigerant, and thus, the refrigerant at the downstream side of the refrigerant channel 130 may have a greater temperature than the refrigerant at the upstream side. Accordingly, it is more effective in terms of securing the performance of cooling the cells 122 of the battery module 120 and of uniformly cooling the cells 122 to use the coolant channel plate 140a having the coolant channels 142a, as shown in FIGS. 3 and 4, in correspondence to the refrigerant-cooling channels 134 of the refrigerant channel 130.

Furthermore, the coolant channels 142a may be disposed to face the refrigerant-cooling channels 134, respectively, in correspondence to the positions of the refrigerant-cooling channels 134, and in particular, the coolant channels 142a may be disposed in the arrangement direction of the refrigerant-cooling channels 134 and the battery cells 122. The coolant channels 142a may be continuously disposed in the flow direction of the refrigerant in the refrigerant channel 130 and the flow direction of the coolant in the coolant channels 142a may be perpendicular to the arrangement direction of the battery cells 122 and the flow direction of the refrigerant. Further, the refrigerant-heating channel 132 may be disposed to face the battery cells 122 of the battery module 120, respectively.

In other words, the coolant channel plate 140a may include the coolant channels 142a that are independently isolated spaces and the coolant channels 142a may be disposed to face the refrigerant-cooling channels 134, respectively. Particularly, the refrigerants in the refrigerant-cooling channels 134 may be cooled under the same temperature condition and the refrigerants in the refrigerant-cooling channels 134 may be uniformly cooled at the same level. In other words, the refrigerants flowing through the refrigerant-cooling channels 134 may be cooled and changed in phase (liquefied) under the same coolant condition.

Figure 5:
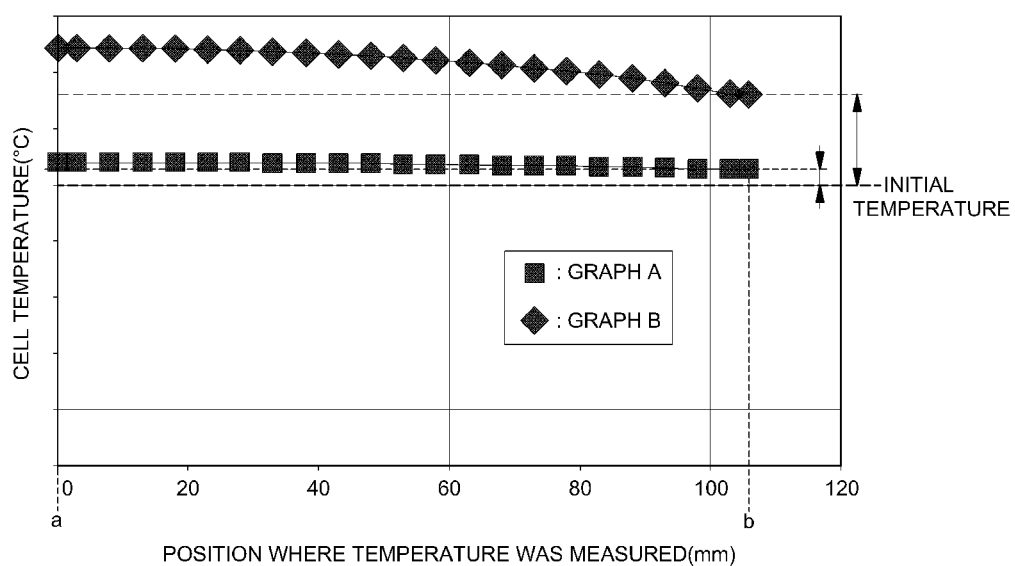
FIG. 5 is a graph comparing temperature distribution of battery cells of a battery having a refrigerant channel and a coolant channel plate according to an exemplary embodiment of the present invention with temperature distribution of battery cells of a battery having only a common refrigerant channel without a coolant channel plate.

The effect of the battery cooling device for a vehicle according to the present invention is further described with reference to FIG. 5. FIG. 5 compares temperature distribution of battery cells of a first battery having a refrigerant channel and a coolant channel plate according to the present invention (graph A) with temperature distribution of battery cells of a second battery having only a common refrigerant channel without a coolant channel plate.

The graph A shows the temperature distribution of the battery cells of a first battery having a refrigerant channel, which has refrigerant-heating channels, refrigerant-passing channels, and refrigerant-cooling channels through which a refrigerant for cooling battery modules flows and that are disposed repeatedly, a coolant channel plate through which a coolant capable of changing the phase of the gaseous refrigerant entering the refrigerant-cooling channels into a liquid state. The graph B shows the temperature distribution of the battery cells of the second battery having a flat plate-shaped refrigerant channel through which a refrigerant for cooling a battery module flows without a coolant channel plate. The temperature distribution of the battery cells in the graphs A and B was measured under the same experimental condition except for the conditions of the refrigerant channel and the coolant channel plate.

In particular, the graph B shows the temperature distribution in the height direction of a predetermined battery cell cooled by a vaporized refrigerant of the battery cells of the second battery and the graph A shows the temperature distribution of a predetermined battery cell disposed at the same position as the battery cell selected in the graph B. The temperature measurement positions 'a' and 'b' in FIG. 5 are the height-directional positions on a battery cell which correspond to the positions 'a' and 'b' in FIG. 1. The cell temperature at the position 'a' is the cell temperature measured at the position 'a' in FIG. 1 which is closest to the refrigerant-cooling channel in the height direction of the battery cell and the cell temperature at the position 'b' is the cell temperature measured at the position 'b' in FIG. 1 which is farthest from the refrigerant-cooling channel in the height direction of the battery cell.

As shown in the graphs in FIG. 5, the cell temperature increase of the first battery to the initial temperature is less than the cell temperature increase of the second battery. Further, the temperature difference in the height direction of the battery cell is less in the first battery than the second battery. From the measuring results shown in FIG. 5, the performance of cooling the battery cell of the first battery having the refrigerant channel and the coolant channel plate was improved and the temperature difference in the height direction of the cells was effectively reduced. In particular, the above-described result may be due to when the refrigerant is vaporized, the refrigerant is capable of being returned into a liquid state by a coolant in the first battery, and thus, latent heat generated when the refrigerant changes in phase (liquid→gas) may be continuously generated in the flow direction of the refrigerant in the refrigerant channel. However, the refrigerant may be unable to return into a liquid state after being vaporized in the second battery, and thus, the cell may be cooled by single-phase sensible heat after the refrigerant is vaporized.

Although exemplary embodiments of the present invention were described in detail above, the scope of the present invention is not limited thereto and various changes and modifications from the spirit of the present invention defined in the following claims by those skilled in the art are also included in the scope of the present invention. According to the battery cooling device of the present invention, the cooling performance of the refrigerant on the battery cell at the end of the upstream side in a refrigerant channel may be maintained at the same level to the battery cell at the end of the downstream side, and thus, it may be possible to maximize the cooling effect on all battery cells arranged in the flow direction of the refrigerant and uniformly cool all of the battery cells.

In particular, battery cooling using two phase flow cooling that uses latent heat generated by a refrigerant when the refrigerant changes in phase instead of cooling that uses single-phase sensible heat is applied, and in particular, the amount of heat that the refrigerant may absorb from battery cells is increased several times. Accordingly, when the battery cooling device of the present invention is selected, the capacities of an air conditioner compressor and a chiller are not required to increase as in existing water-cooling system and it may also be possible to maintain the temperature of battery cells within a predetermined range using a relatively minimal amount of refrigerant.

What is claimed is:

1. A battery cooling device for a vehicle for cooling a battery module having a plurality of battery cells, comprising:
   a refrigerant channel disposed in an arrangement direction of the battery cells to exchange heat with the battery cells; and
   a coolant channel plate disposed to exchange heat with the refrigerant channel and allow a coolant for cooling a refrigerant heated by heat from the battery cells in the refrigerant channel into a liquid state to flow therethrough,
   wherein the refrigerant channel includes a plurality of refrigerant-heating channels through which the refrigerant is heated by exchanging heat with the battery module and plurality of refrigerant-cooling channels through which the refrigerant is cooled by exchanging heat with the coolant channel plate and a plurality of refrigerant-passing channels connected between the refrigerant-heating channels and the refrigerant-cooling channels, and the refrigerant-heating channels and the refrigerant-cooling channels are disposed alternately in the arrangement direction of the battery cells, and
   wherein the refrigerant-heating channels contact only the battery calls of the battery cells disposed over the refrigerant channel, and the refrigerant-cooling channels contact only the coolant channel plate, and the refrigerant-passing channels connect between the refrigerant-heating channels and the refrigerant-cooling channels without contact with any one of the battery cells and the coolant channel plate.

2. The device of claim 1, wherein the refrigerant channel is disposed to exchange heat with the battery cells through contact with the battery cells and the coolant channel plate is disposed to exchange heat with the refrigerant channel through contact with the refrigerant channel.

3. The device of claim 1, wherein the refrigerant flowing through the refrigerant channel is heated into a gas state in the refrigerant-heating channels by heat from the battery cells and is cooled into the liquid state in the refrigerant-cooling channels by a coolant in the coolant channel plate.

4. The device of claim 1, wherein the coolant channel plate includes a coolant channel through which a coolant flows and the flow direction of the coolant is perpendicular to the flow direction of the refrigerant flowing through the refrigerant channel.

5. The device of claim 1, wherein the battery cells and the refrigerant-heating channels are in contact with each other to exchange heat through an intermediate.

6. The device of claim 1, wherein the coolant channel plate and the refrigerant-cooling channels are in contact with each other to exchange heat through an intermediate.

7. The device of claim 4, wherein a plurality of coolant channels are formed in the coolant channel plate and disposed to face the refrigerant-cooling channels, respectively.

8. The device of claim 1, wherein the refrigerant channel is a plate-shaped tube having a serpentine structure.

9. The device of claim 5, wherein the intermediate is inserted between the battery cells and the refrigerant-heating channels.

10. The device of claim 6, wherein the intermediate is inserted between the refrigerant-cooling channels and the coolant channel plate.

* * * * *